Dec. 4, 1945. K. TANDETZKE 2,390,193
AUTOMOBILE ROOF
Filed Feb. 5, 1941
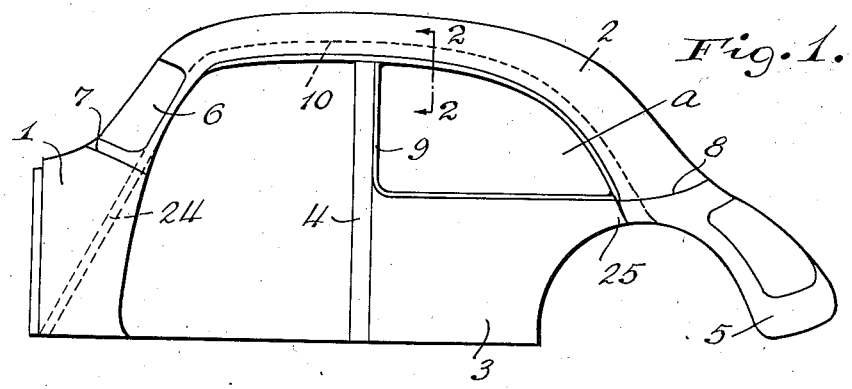
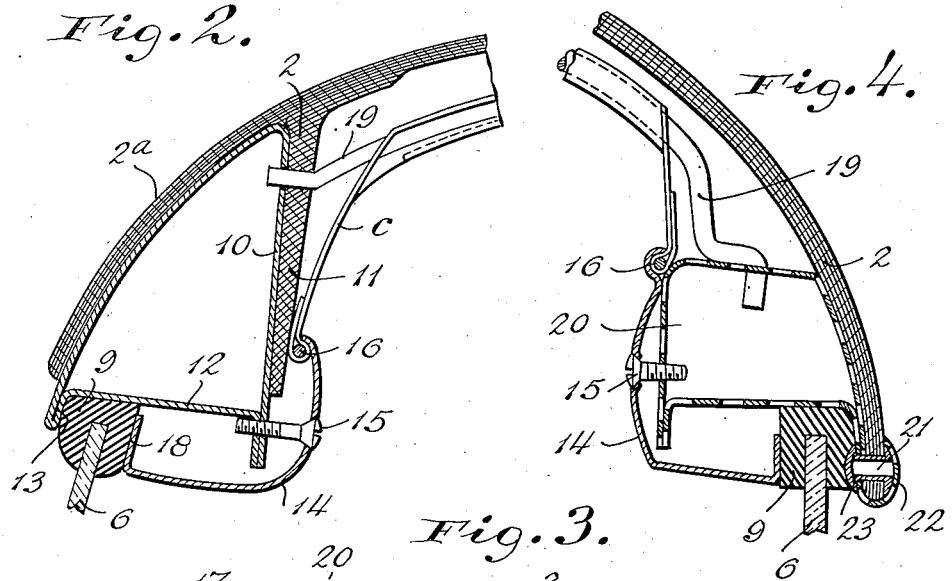
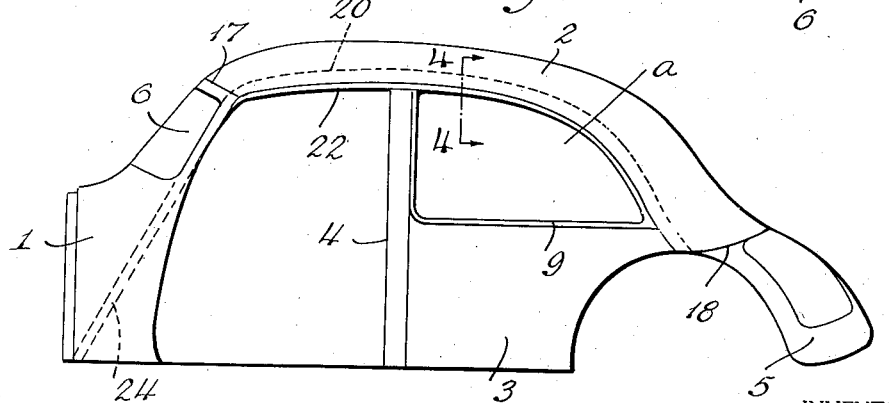
INVENTOR.
KARL TANDETZKE
BY Richards & Geier
ATTORNEYS Patented Dec. 4, 1945

2,390,193

UNITED STATES PATENT OFFICE 2,390,193

AUTOMOBILE ROOF

Karl Tandetzke, Berlin, Germany; vested in the Alien Property Custodian

Application February 5, 1941, Serial No. 377,449
In Germany July 7, 1939

5 Claims. (Cl. 296—137)

This invention relates to roofs of vehicle bodies and refers more particularly to an automobile roof pressed out of laminated materials saturated in synthetic resin.

Automobile bodies consisting of laminated materials saturated in synthetic resin, may be made of individual parts, each of which is shaped separately into the desired form by the application of heat and pressure. These parts are then easily united into a complete vehicle body which has great resistance against pressure and shocks and does not require any supporting ribs. Additional advantages of this construction are the simplification of the assembling operation, cheapness of manufacture and the possibility of replacing any damaged part of the body without having to replace the body as a whole.

The roof of such vehicle bodies is a part which is subjected least of all to any external stresses. In self supporting automobile bodies the roof serves largely as a support constituting the connecting and reinforcing element of the body.

An object of the present invention is the provision of a vehicle body, the roof of which constitutes an exceptionally strong and secure force-transmitting connection between the front and the rear of the body.

Other objects of the present invention will become apparent in the course of the following specification.

In accomplishing the objects of the present invention it was found advisable to form the roof of a vehicle by pressure as a single piece, without joints, said piece having the form of a continuous trough extending from the windshield to the rear of the car.

In accordance with a preferred embodiment of the inventive idea, the posts situated close to the windshield and, possibly, a part of the rear portion of the body extending approximately to the baggage compartment, are pressed along with the roof, and constitute a single pressing extending as a bridge between the front and the rear of the vehicle. The connections or the supports of this piece are situated then at the level of or below the lower edge of the windows.

An advantage of this arrangement is that the roof can be mounted upon the remaining part of the body without any special frame and that no special adaptation of its form to the edges of the sides of the body is necessary. The roof is merely connected at its sides with the middle posts upon which the doors are suspended. It is not necessary to have a special window frame which in prior art constructions was made of one piece with the side of the body. In accordance with the present invention, the sides of the body extend only to the lower edges of the windows and a window is inserted into an opening formed between an edge of the roof, a middle post and the lower edge of a side of the vehicle body.

The invention will appear more clearly from the following detailed description when taken in connection with the accompanying drawing showing, by way of example, preferred embodiments of the inventive idea.

In the drawing:

Figure 1 is a side view of a vehicle body having a continuous roof and consisting of pressed out parts saturated in artificial resin.

Figure 2 illustrates a section bar pressed into the roof and is a transverse section along the line 2—2 of Figure 1.

Figure 3 is similar to Figure 1 and illustrates a somewhat different construction.

Figure 4 illustrates a section bar inserted into the roof, and is a transverse section along the line 4—4 of Figure 3.

The automobile body shown in Figures 1 and 2 has a front portion 1 which serves as a support for the hood, a roof 2, sides 3, door posts 4 and a rear portion 5, enclosing the opening of the luggage compartment and consisting of an upper part and a lower part. All these elements are connected to each other by pressed out transversely extending flanged edges, in a manner well known in the art and not illustrated in the drawing.

The parts of the automobile body consist, preferably, of bands of paper, textiles or other fibrous material saturated in a binder consisting of or similar to an artificial resin, to form laminated layers impregnated with artificial resin.

Thus, the body parts are formed of continually extending bands, whereby the forming and pressing operations are considerably facilitated. The parts are comparatively thin and have no portions of greatly increased thickness, so that the time necessary for the pressing and hardening is diminished to a desirable minimum.

In accordance with the present invention, the roof 2 of the automobile body is pressed out of one piece with the frame 6 of the windshield. The roof 2 has the form of a continuous one-piece tray and constitutes a bridge-like support connecting the front part of the automobile body with the rear. Due to this form, the roof is exceptionally strong and has great resistance against shocks and external forces. The roof is of substantially uniform thickness throughout its length and edges.

The line 7 in Figure 1 indicates the connection between the front edge of the roof 2 and the front portion 1, while the line 8 indicates the connection between the rear edge of the roof 2 and the rear portion 5 of the automobile body.

The middle posts 4 consist of section bars coated with artificial resin, the upper ends of which are firmly connected to the roof edges by any suitable means not shown in the drawing.

The rear side portions 3 of the automobile body are connected to the middle posts 4, to the edges of the roof 2 and to the rear portion 5. Thus an opening $a$ is formed on each side of the body between the parts 2, 3 and 4, into which the side window frame 9 is inserted.

The free edges of the roof 2 may be provided with section bars serving the double purpose of increasing the rigidity of the roof and of strengthening its edges. These section bars extend longitudinally along the edges of the roof 2 and constitute a self-supporting frame.

Figure 2 shows a hollow section bar 10 which may consist of a hard aluminum alloy and which is pressed into an edge of the roof. The bar 10 has a triangular cross section and one of its two sides is somewhat curved to conform to the curvature of the roof.

As shown in Figure 2, the bar 10 is firmly embedded between an edge 2a of the roof and an inner vertical flange 11.

The lower side of the bar 10 is closed by a transverse ledge 12, which strengthens it and constitutes its bottom. The ledge 12 is provided with an outer step-like downwardly extending projection 13, to form a support for the elastic frame 9 of the side window. Another support holding the window frame 9 is formed by inner ledge 14 constituting a covering for the bar 10 and having a flange 18 which presses against the window frame 9. Thus the upper window frame portion 9 is clamped between the flanges 13 and —18.

The ledge 14 is attached to the bar 10 by bolts 15 and, in addition, serves as a support for the roof covering $c$. The covering $c$ has a reinforced edge 16 which is clamped by the upper end of the ledge 14, so that the edge 16 is firmly held between the flange 11 on one hand and the ledge 14 on the other hand.

Transverse sticks 19 are used to stretch the roof covering $c$ and to hold it in position below the roof 2.

As shown in Figure 1, the metal bars 10 project beyond the roof 2 in the form of supporting columns 24 extending along the automobile portion 1, which are used for attaching the roof 2 to the front element 1 of the automobile body.

Only one of the flanges of each of the two bars 10 is extended beyond the rear edge of the roof 2. These flanges form columns 25 serving as connections between the sides 3 and the rear portion 5 of the automobile.

The automobile body shown in Figure 3 is substantially similar to that shown in Figure 1, the same parts being designated by the same numerals.

In this construction, the front portion 1 is combined with the windshield frame 6 to one piece, so that the joint between the roof 2 and the front portion extends along the line 17.

The roof 2 extends down to the rear portion 5 and the line 18 will constitute the connection between these two parts.

Figure 4 illustrates a steel bar 20 which is attached to the edge of the roof 2 after the latter has been completed. The steel bar 20 has the form of a hollow body, such as a box in cross section and consists of U-shaped section bars which fit one into the other.

The bar 20 is attached to the roof 2 by tubular rivets 21 which are covered from the outside by a bent ledge-like edge 22 of the support 20.

In the course of the assembly, the rivets 21 are inserted from the outside into corresponding bore holes provided in the edge of the roof 2 and are affixed therein by any suitable correspondingly shaped tool, such as pliers (not shown).

The bent edge 22 of the steel bar 20 makes it possible to dispense with any separate constructional element for the covering of the rivet heads and at the same time, strengthens and protects the edge of the roof 2; it serves as a counter-support and a covering for the rivets 21.

The steel bar 20 is attached to the window frame 9, the covering ledge 14 and the roof covering $c$ in a manner similar to that shown in Figure 2.

It is apparent that the specific illustrations shown above have been given by way of illustration and not by way of limitation and that the structures above described are subject to wide variation and modification without departing from the scope or intent of the invention. For instance, any constructional details of the body shown in Figure 1 may be incorporated in the body shown in Figure 3. All of such and other variations and modifications are to be included within the scope of the present invention.

What is claimed is:

1. In a vehicle body, the combination of a roof having lateral depending flanges and edge portions curved outwardly and downwardly from said flanges, to form lateral channels; supporting means for the roof comprising girders pressed into said channels, respectively, said girders extending continuously from the front to the rear of the vehicle; and front and rear body elements on which said girders are mounted.

2. In a vehicle body, the combination of a roof having lateral depending flanges and edge portions curved outwardly and downwardly from said flanges, to form lateral channels having inner vertical walls and outer curved walls; supporting means for the roof comprising box girders triangular in cross-section which extend continuously from the front to the rear of the vehicle, in said channels, respectively, each girder having an inner vertical side received against the outer face of one of the roof flanges, an outer curved side received against the inner face of one of the roof edge portions, and a horizontal bottom extending between the lower ends of the roof flanges and roof edge portions; and front and rear body elements on which said girders are mounted.

3. In a vehicle body, the combination of a roof having downwardly curved lateral eaves, and downwardly extended lateral flanges spaced inwardly from the eaves; bars pressed into the lateral spaces between the eaves and the flanges, respectively, and extending continuously from the front to the rear of the vehicle; front and rear body elements on which the ends of the bars are mounted; a flange on the outer edge of each bar extending downwardly beyond the lower edge of its associated eave; an arcuate plate mounted on each bar with its inner edge bearing against the roof flange and its outer edge turned to form a flange parallel with the bar flange; and a window frame clamped between the bar flange and the plate flange.

4. In a vehicle body, the combination of a roof having downwardly curved lateral eaves, and downwardly extended lateral flanges spaced inwardly from the eaves; bars pressed into the lateral spaces between the eaves and the flanges, respectively, and extending continuously from the front to the rear of the vehicle; front and rear body elements on which the ends of the bars are mounted; a flange on the outer edge of each bar extending downwardly beyond the lower edge of its associated eave; an arcuate plate mounted on each bar with its inner edge bearing against the roof flange and its outer edge turned to form a flange parallel with the bar flange; a window frame clamped between the bar flange and the plate flange; and means for fastening each bar flange to its associated eave.

5. In a vehicle body, the combination of a roof having downwardly curved lateral eaves, and downwardly extended lateral flanges spaced inwardly from the eaves; bars pressed into the lateral spaces between the eaves and the flanges, respectively, and extending continuously from the front to the rear of the vehicle; front and rear body elements on which the ends of the bars are mounted; a flange on the outer edge of each bar extending downwardly beyond the lower edge of its associated eave; an arcuate plate associated with each of said bars and having its inner edge bearing against the inner side of the roof flange and its outer edge turned to form a flange parallel with the downwardly extended flange of the associated bar; a window frame disposed between each pair of bar flanges and plate flanges; and screw bolts threaded into the bars and having heads bearing on the plates, clamping one end of each plate against its associated roof flange and the other end against the window frame.

KARL TANDETZKE.